United States Patent [19]

Shuert

[11] Patent Number: 4,856,657

[45] Date of Patent: * Aug. 15, 1989

[54] CONTAINER WITH SLEEVE INTERLOCKING LATCH

[76] Inventor: Lyle H. Shuert, 817 N. Fieldstone, Rochester, Mich. 48063

[*] Notice: The portion of the term of this patent subsequent to Nov. 5, 2002 has been disclaimed.

[21] Appl. No.: 204,478

[22] Filed: Jun. 9, 1988

Related U.S. Application Data

[63] Continuation of Ser. No. 80,230, Jul. 28, 1987, Pat. No. 4,765,252, which is a continuation of Ser. No. 858,524, Apr. 23, 1986, abandoned, which is a continuation of Ser. No. 642,778, Aug. 21, 1984, abandoned.

[51] Int. Cl.[4] .............................................. B65D 19/06
[52] U.S. Cl. .................................. 206/600; 108/55.1; 206/386
[58] Field of Search .................... 108/51.3, 52.1, 53.1, 108/55.1, 55.3, 55.5, 56.1, 56.3; 206/386, 595, 596–600; 217/43 A; 220/4 F, 4 R

[56] References Cited

U.S. PATENT DOCUMENTS

| | | | |
|---|---|---|---|
| 2,893,588 | 7/1959 | Martin | 108/55.1 |
| 3,611,952 | 10/1971 | Hoffman | 108/53.3 |
| 3,699,901 | 10/1972 | Cook, III | 108/55.5 |
| 3,709,160 | 1/1973 | Howard et al. | 108/901 |
| 3,986,659 | 10/1976 | Vajtay | 220/4 R |
| 4,244,471 | 1/1981 | Plante | 206/386 |
| 4,480,748 | 11/1984 | Wind | 206/386 |
| 4,550,830 | 11/1985 | Shuert | 206/386 |
| 4,606,278 | 8/1986 | Shuert | 108/901 |
| 4,742,785 | 5/1988 | Shuert | 206/600 |
| 4,765,252 | 8/1988 | Shuert | 220/4 F |

FOREIGN PATENT DOCUMENTS 1018243 1/1966 United Kingdom ................ 220/4 F

*Primary Examiner*—Jimmy G. Foster
*Attorney, Agent, or Firm*—Krass & Young

[57] ABSTRACT

A reusable plastic base serves as a pallet which may be lifted by the forks of a fork-lift truck. A sleeve is removably attached to the base and forms the sidewalls of the container. In the preferred embodiment, the sleeve is made of corrugated material having slots formed along its lower edge. The slots are adapted to coact with latch members slidably mounted in the base to releasably secure the pallet to the sleeve. The base is preferably designed with a peripheral groove lying substantially at floor level to receive the edge of the sleeve. Compressive loads applied to the container are transferred to the sleeve directly to the floor, thereby minimizing deformation of peripheral portions of the base.

26 Claims, 3 Drawing Sheets

U.S. Patent    Aug. 15, 1989    Sheet 2 of 3    4,856,657
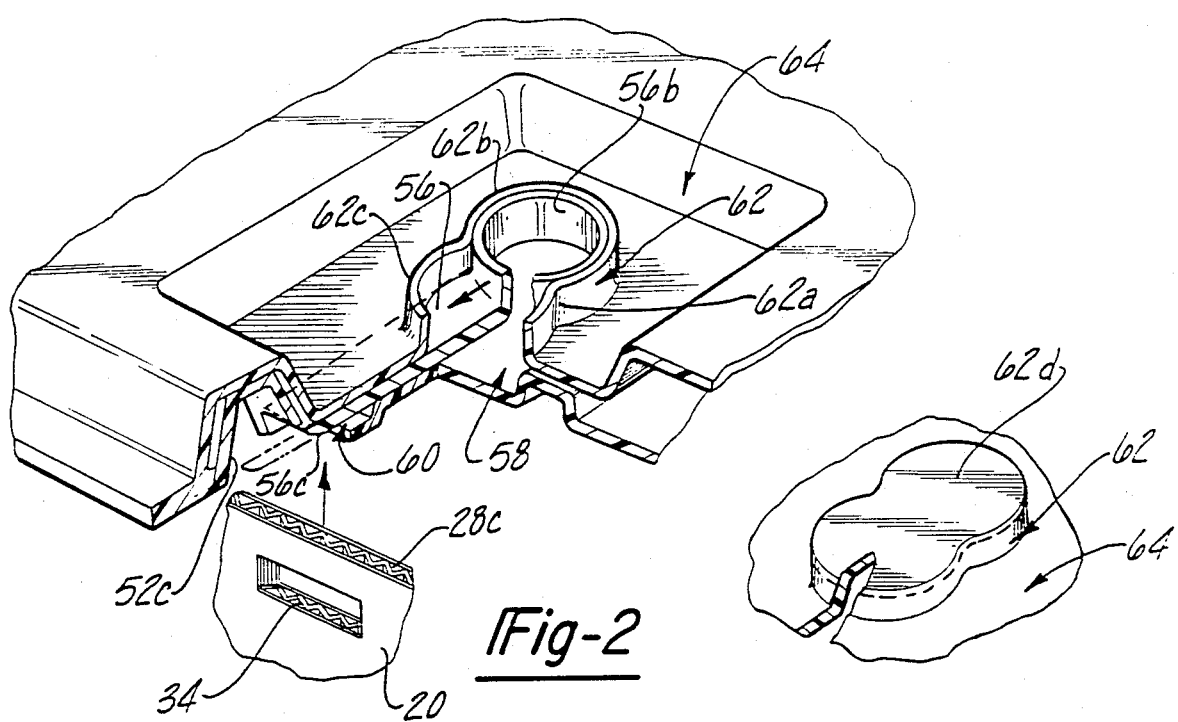
Fig-2
Fig-4
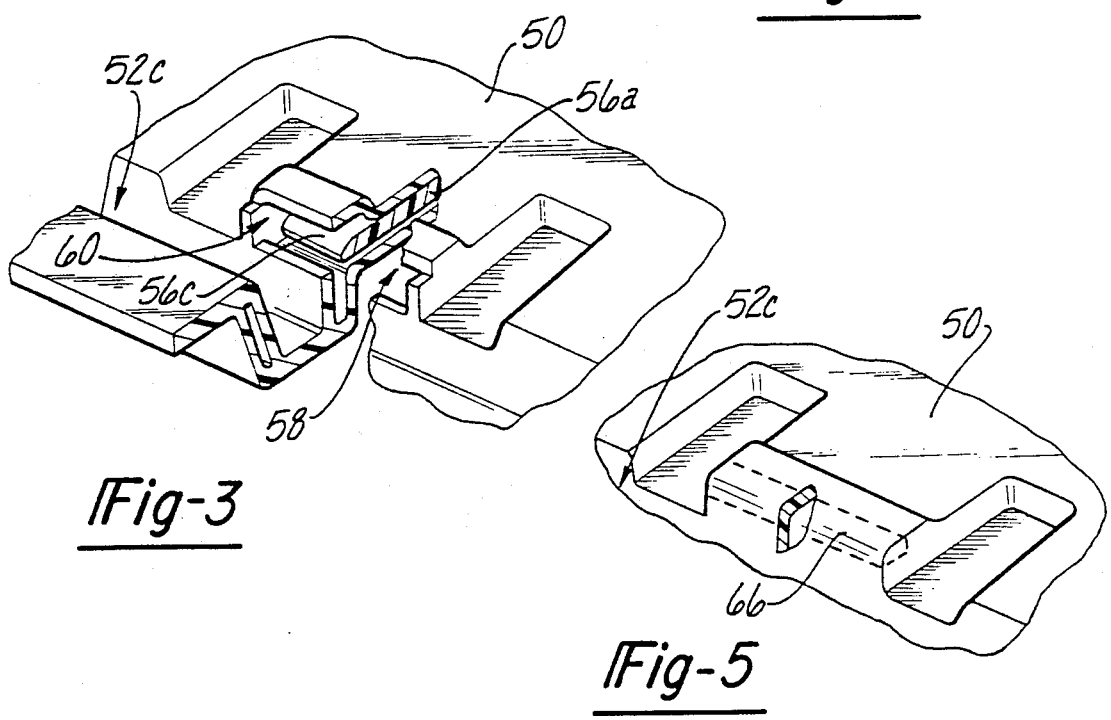
Fig-3
Fig-5

CONTAINER WITH SLEEVE INTERLOCKING LATCH

RELATED APPLICATION

This application is a continuation of U.S. patent application Ser. No. 080,230 filed on July 28, 1987, U.S. Pat. No. 4,765,252, which is a continuation of U.S. patent application Ser. No. 858,524 filed on Apr. 23, 1986, abandoned, which is a continuation of U.S. patent application Ser. No. 642,778 filed on Aug. 21, 1984, abandoned.

BACKGROUND OF THE INVENTION

This invention relates to shipping and storage containers. More particularly, it relates to containers in which the base of the container serves as a reusable pallet.

Various container designs have been employed to ship and store industrial goods. In many instances the containers are stored in large warehouse facilities where they are moved from one location to another by forklift trucks or the like. One commonly used container incorporates a corrugated sleeve which is nailed to a conventional wooden pallet. The sleeve forms the side walls of the container and the pallet serves as its bottom. The use of the wooden pallets, however, has some drawbacks. For example, they are subject to breakage and thus are not reusable over an extended period of time. Wooden pallets also take up a considerable amount of valuable floor space in the warehouse when they are not in use.

In an effort to solve some of the problems with the wooden pallets, reusable plastic pallets have been employed with some degree of success. Such pallets have been combined with corrugated sides and a plastic cover to form a container. The plastic pallet and cover are reusable and may be more compactly stacked when not in use, thereby providing significant advantages over the use of conventional wooden pallets. U.S. Pat. No. 4,254,873 to Cook III et. al. is a representative example of such a composite container design.

These composite container designs also have their drawbacks. The edges of the sleeve merely rest in grooves in the pallet and cover in most of the known designs. Consequently, some additional means must be provided to hold them together prior to shipping. Generally the pallet, corrugated sleeve, and cover are banded together by steel bands or cords encircling the three components. This banding process introduces an additional expense in both time and money since the container must not only be bound prior to shipping but it also must be unbound before the containers contents can be removed.

As previously noted, warehouse space is valuable. It is therefore desirable to be able to stack these composite containers on top of one another in order to conserve space. In such instances the lower containers often experience substantial compressive forces from the weight of the upper containers. These compressive forces are generally transferred by the sides of the container downwardly to the peripheral edges of the pallet. In the typical prior art designs, legs or spaces providing clearance for the skids of the forklift are spaced inwardly of the peripheral edges of the pallet. The compressive loads applied through the sides of the container are often sufficient to deform the peripheral portions of the pallet outside of the supporting legs or spacers. Such deformation may damage the pallet to such an extent that it is not readily reusable.

The structural rigidity of these pallets may be enhanced by using more plastic material or by using special reinforcing means but such measures unduly increase manufacturing costs.

The present invention is directed to solving one or more of these problems.

SUMMARY OF THE INVENTION

There are several inventive features disclosed in this patent which may be used alone or in combination. One feature is the provision of a container employing a base and a removable sleeve providing side walls for the container. The sleeve includes a plurality of slots formed at peripherally spaced locations along its lower edge portion. These slots are aligned with latches slidably mounted in peripherally spaced portions of the base. The latches are adapted to pass through the slots to securely hold the sleeve on the base. In the preferred embodiment, the base is made of plastic and the sleeve is made of corrugated material. The base is also formed with indentations which serve to receive the skids of a forklift or the like so that the base may function as a pallet and the latches are mounted in the base in the vicinity of the skid indentations.

A cover may optionally be provided for the container. The cover is preferably identical to the base and is removably attached to the sleeve in an identical manner.

Another feature of the invention is that the base includes means lying in substantially the same plane as the bottom surface of the base for receiving the lower edges of the sleeve. The skid receiving indentations in the base are located inboard and above at least the corner edges of the sleeve. Accordingly, downward compressive forces applied to the container are transferred by the sleeve substantially directly to the supporting surface, thereby minimizing deformation of the peripheral portions of the base.

BRIEF DESCRIPTION OF THE DRAWINGS

Various other advantages of the present invention will become apparent to one skilled in the art upon reading the following specification and by reference to the drawings in which:

FIGS. 2-8 are fragmentary perspective detail views showing various aspects of the construction and operation of the latch and slot locking arrangement of the invention.

DETAILED DESCRIPTION OF THE PREFERRED EMBODIMENT

Figure 1:
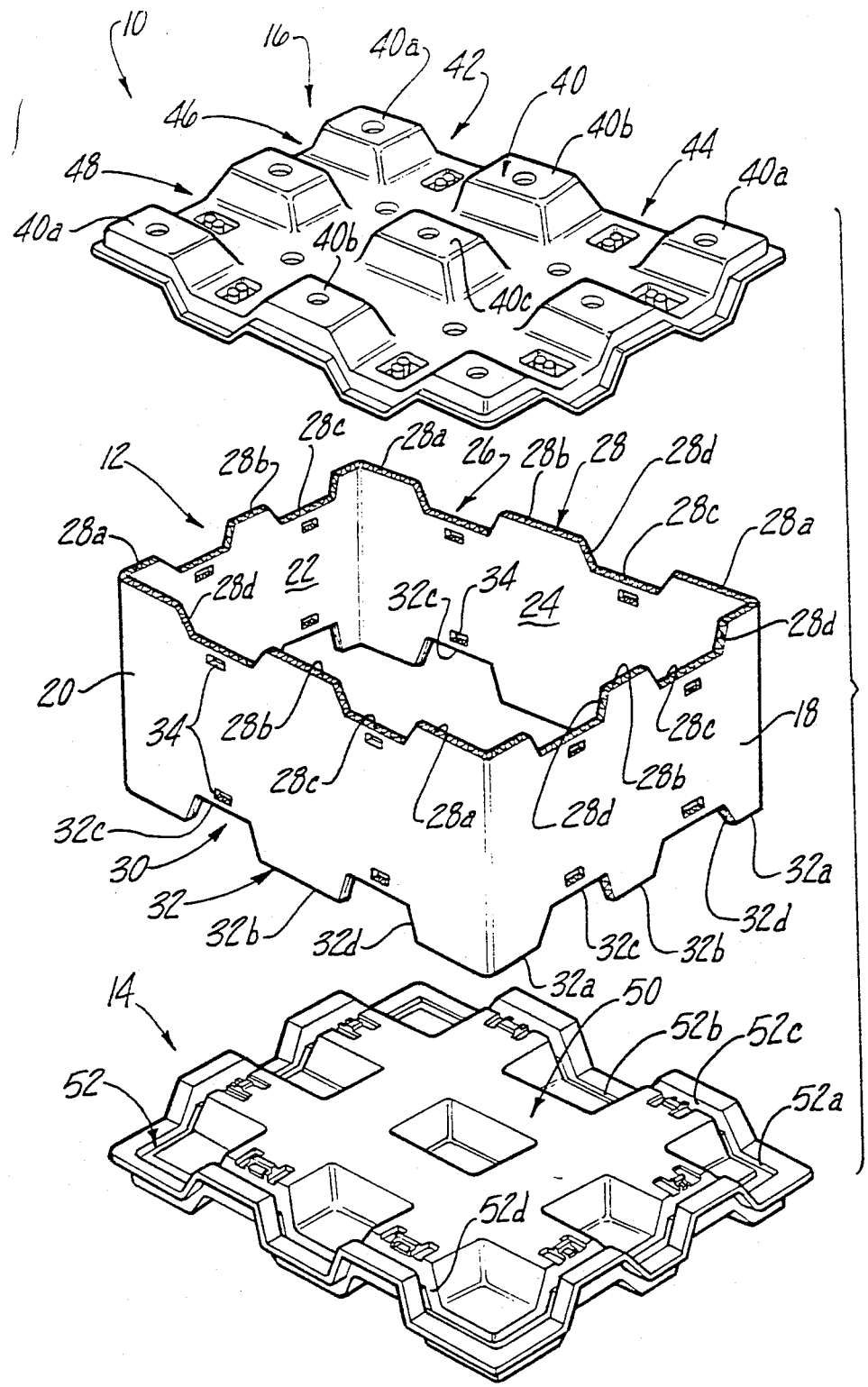
FIG. 1 is an exploded perspective view of a container made in accordance with the preferred embodiment of the invention.
Figure 6:
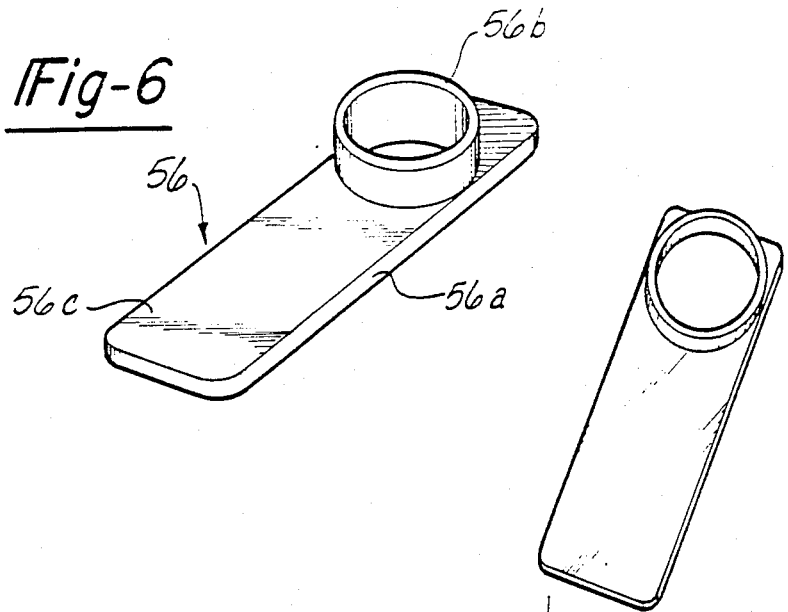

FIG. 1 illustrates a container 10 made in accordance with the preferred embodiment of the present invention. Container 10 is of composite design employing a sleeve 12 removably attached to a lower end unit or base 14 and an upper end unit or cover 16. Sleeve 12 takes the form of an open-ended rectangular box providing side walls 18, 20, 22 and 24 for the container 10. In this embodiment, sleeve 12 is formed of three ply panels of corrugated material such as is commercially available from Tri-Wall Containers, Inc. Corrugated material for sleeve 12 is preferred because it is relatively inexpensive, is easy to form, and can be collapsed when not in use. At the same time, the preferred corrugated sleeve exhibits comparatively good strength characteristics. However, it should be understood that various other suitable materials may be used for sleeve 12.

A plurality of inverted truncated pyramidal cutouts 26 are defined in the top edge 28 of the sleeve so that top edge 28 is constituted by corner portions 28a, intermediate portions 28b, inset portions 28c, and angled portions 28d. Similarly, a plurality of truncated pyramidal cutouts 30 are defined in the bottom edge 32 of the sleeve so that bottom edge 32 is constituted by corner portions 32a, intermediate portions 32b, inset portions 32c, and angled portions 32d. A through slot 34 is provided immediately below and centrally on each top edge inset portion 28c and immediately above and centrally of each bottom edge insert portion 32c.

In the preferred embodiment, end units 14 and 16 are identical. In use, the cover end unit 16 is flipped over 180° with respect to the base end unit 14. The base and cover units are preferably made of plastic and thus the same mold may be used to make both units. In this embodiment, the base and cover are made by vacuum forming sheets of organic polymeric material such as polyethylene. They are both made of a twin sheet construction employing two skins which are fused or knitted together at various points to aid in structural rigidity. However, it should be noted that various plastic materials and other formation techniques such as injection molding, rotocasting and the like may be alternately employed.

Since the base 14 and the cover 16 end units are identical, the same reference numerals will be used to refer to common elements. Each end unit is generally planar and includes a flat outer face 40 configured so that at least the corner sections thereof may lie on the supporting surface such as the floor for the container. A plurality of elongated tunnels or indentations 42–48 displaced from the plane of face 40, extend transversely and longitudinally across face 40 to divide face 40 into a plurality of spaced sections including corner sections 40a, intermediate sections 40b, and a central section 40c. Indentations 42–48 provide relieved access areas for receiving the forks of a forklift truck or the like. As a consequence, the end unit may serve as a pallet for the container 10 which may thus be lifted and moved by conventional warehousing equipment. Indentations 42–48 also provide a cross hatch configuration for the inner face 50 of the end unit.

The periphery of inner face 50 is provided with a continuous circumferential groove 52 for receiving the related edge of sleeve 12. Groove 52 has end portions 52a, opposite outer face end sections 40a; intermediate portions 52b opposite outer face intermediate section 40b; inset portions 52c opposite outer face tunnels 42–48; and angled portions 52d interconnecting portions 52a–52c and 52b–52c. Portions 52a, 52b and 52c have a size, configuration, and contour matching that of sleeve edge portions 32a–32d so that when an edge portion of the sleeve 12 is fitted into a groove 52 the surfaces of the groove and the adjacent surfaces of the edge portion of the sleeve provide a snug, contiguous fit around the entire interfitting circumference of the sleeve and end unit. In particular, with the sleeve and end units thus interfitted, inset edge portions 32c are disposed in inset groove portions 52c with slots 34 totally captured in the groove, and edge portions 32a and intermediate portions 32b are positioned substantially in the plane of end unit outer surface 40 so that, in the case of an end unit constituting a ground supported pallet for the container, the bottom edge of the sleeve terminates substantially at ground level. Thus, compressive forces applied downwardly to the container 10 are transferred by the sleeve 12 substantially directly to the floor or other supporting surface. As a result, deformation problems associated with the prior art designs are effectively eliminated without a substantial increase in manufacturing costs.

A plurality of latch assemblies are provided on each end unit 14,16 at circumferentially spaced locations thereabout. The latch assemblies correspond in number and circumferential position to the slots 34 in sleeve 12.

Each latch assembly includes a latch member 56 mounted in the end unit for detented, sliding movement between a retracted position in which the related sleeve edge is free to enter or leave groove portion 52c and an extended or locking position in which the tip of the latch member is lockingly engaged in a related sleeve slot 34 to lockably but releasably secure the sleeve to the end unit.

Latch members 56 are preferably formed of the same plastic material as the end units and each includes a main body portion 56a, in the form of an elongated plate, and a annular handle or actuator portion 56b formed integrally with main body portion 56a adjacent one end thereof. Latch members 56 are slidably positioned between the inner and outer skins of the end unit. Specifically, the inner and outer skins are configured to define slideways 58 extending perpendicularly inwardly from groove portions 52c and opening at their outboard ends 60 in those groove portions. Latch members 56 are positioned in slideways 58 with latch handle portions 56b received in detent structures 62 formed integrally with the outer skin of the end unit and disposed in depressions 64 formed in the outer skin at the outboards ends of tunnels 42–48.

Detent structures 62 have a generally figure eight formation with the neck 62a at the juncture of the two halves of the detent dimensioned to be slightly smaller than the external diameter of latch handle portion 56b so that handle portion 56b passes snappingly between detent halve 62b and 62c as the latch moves between its retracted and extended positions in response to a pull or push exerted by a finger or fingers inserted into the open end of handle portion 56b.

Figure 7:
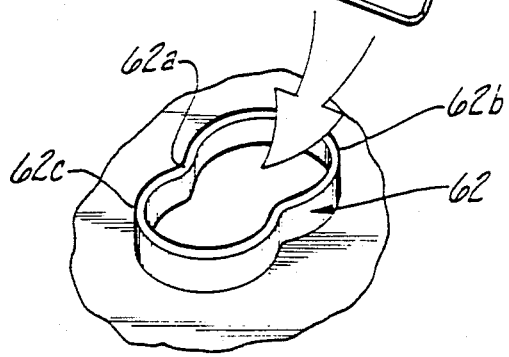
Figure 8:
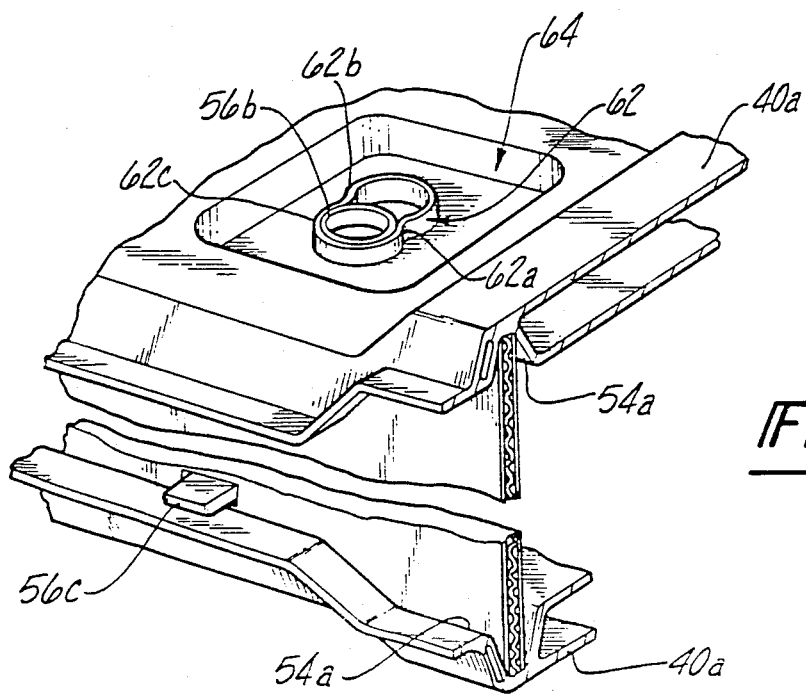

End units 14 and 16 are preferably formed in a twin sheet press in which the two skins of the unit are individually formed and then fused or knitted together to form the double wall structure. The unit leaving the press includes cover material 62d (FIG. 4) over detent 62, which is suitably punched out, and material 66 (FIG. 5) covering slideway opening 60, which is suitably cut away. Latch members 56 are then mounted in slideways 58 by inserting them tip end first (FIG. 7) into detents 62.

The invention container may be readily assembled by positioning the lower edge 32 of a sleeve 12 in the circumferential groove 52 of a base end unit 14, positioning a cover end unit 16 over the sleeve with the sleeve upper edge 28 positioned in the circumferential groove 52 of the cover end unit, and reaching into the tunnels or indentations 42–48 on both end units to grasp latch handle portions 56b and move the latches snappingly outwardly to their extended positions in which the tips 56c of the latches enter and lockingly engage with sleeve slots 34 to positively lock the sleeve to the end unit. Since handle portions 56b are positioned in indentations 42-48, the latches are readily accessible irrespective of the location or stacking disposition of the related container. Disassembly of the container is of course readily achieved by a reverse procedure in which the latches, which as noted are always readily accessible, are moved snappingly to their retracted positions to allow separation of the sleeve and end units.

Those skilled in the art will appreciate that the design of the present invention offers significant advantages over previous composite container designs. Among the advantages is the elimination of the requirement of banding the components together. By contrast, the container of the present invention may be assembled or disassembled quite easily without necessitating external apparatus. The containers when assembled are stackable on top of one another due to their durable design. It may be advantageous to employ some sort of interlocking structure on the bottom of the base and top of the cover to prevent lateral slippage of the stacked containers. However, this is well within the skill of the ordinary practioner. By bringing the sleeve substantially to the floor level, or to the level of the upper surface of an underlying container, the container can withstand substantial compressive loads without having to use substantial amounts of plastic or additional reinforcing means when forming the base to counteract such loads. When the container is disassembled the base and cover may be easily stacked and nested within one another in a compact manner ready for use. The sleeve, likewise, may be collapsed and neatly stored when not in use. The disclosed latch and slot arrangement allows the containers to be repeatedly assembled without significant damage to the sleeve. On the other hand, the relatively inexpensive corrugated sleeve material may be thrown away as desired after a period of use. Still other advantages and modifications of the preferred embodiment of the invention will become apparent to those skilled in the art upon a study of the specification, drawings and claims.

I claim:

1. A container comprising:
a base member having an upper face and a lower face;
said lower face including first surfaces arranged at a first level to define a support surface for the base member and second surfaces arranged at a second level, above said first level, to define indentations for receiving the forks of a fork-lift truck;
said upper face defining an upwardly facing seat means on peripheral portions of said base member substantially at said first level; and
a sleeve member having a lower edge including lower portions adapted to seat on said seat means.

2. A container according to claim 1 wherein:
said seat means is defined at the corners of said base member; and
said lower portions of said sleeve lower edge include the corners of said sleeve member.

3. A container according to claim 2 wherein:
said base member and said sleeve member are generally rectangular;
said seat means are further defined at at least one location along each side of said base member intermediate the corners; and
said sleeve member lower edge includes a lower portion along each side thereof intermediate the corners for seating coaction with a corresponding intermediate seat means location on said base member.

4. A container according to claim 2 wherein:
said sleeve member is selectively cut away along its lower edge between its corners to define lower corner portions of said lower edge seated on said seat means and raised portions of said lower edge positioned over said indentations.

5. A container according to claim 4 wherein:
two indentations are provided along each side of said base member; and
the lower edge of each sleeve member, along each side of said sleeve member, includes a lower corner portion, a raised portion, an intermediate lower portion, a further raised portion, and a lower corner portion.

6. A container according to claim 1 wherein:
said container further includes coacting releasable attachment means on said sleeve member and on said base member for releasably attaching said sleeve member to said base member.

7. A container according to claim 6 wherein:
said releasable attachment means comprises slots on one of said members releasably receiving male devices on the other of said members.

8. A container according to claim 7 wherein:
said releasable attachment means are defined in the vicinity of said indentations.

9. A container according to claim 7 wherein:
said slots are provided in the lower edge portion of said sleeve member at a plurality of locations spaced about the periphery thereof; and
said male devices comprise a plurality of latches mounted on said base member for respective coaction with said slots and each reciprocal on said base member between a latching position in which it respectively passes through the corresponding slot to releaseably secure said sleeve member to said base member and a released position in which it is withdrawn from the corresponding slot to allow removal of said sleeve member from said base member.

10. A container comprising:
a generally rectangular reusable plastic pallet having a lower face configured so that at least the corners of the pallet have bottom surfaces which are adapted to rest on a supporting surface for the containers and defining a plurality of indentations running laterally across said lower face and inboard of the corners providing relieved areas for receiving the skids of a fork-life truck or the like;
an open ended rectangular sleeve made of corrugated material providing side walls for the container;
said pallet further defining seat means formed on the upper face of the pallet at substantially the level of said bottom surfaces and adapted to receive lower edge portions of the sleeve; and
coacting releasable attachment means on said sleeve and on said pallet for releasably attaching said sleeve to said pallet.

11. A container comprising:
a generally rectangular base member in which at least the corners thereof have lower face portions lying in the same plane and constituting a lower support surface for said base member;
elongated indentations in the lower face of said base member located inboard of the corners and adapted to provide relieved areas for receiving the skids of a fork-life truck or the like;

an open-ended rectangular sleeve providing side walls for the container;

receiving means on peripheral portions of the upper face of said base member extending to substantially the same level as said lower face portions and adapted to receive lower edge portions of said sleeve; and coacting releasable attachment means on said sleeve and on said base member for releasably attaching said sleeve to said base member.

12. The reciprocal of claim 11 wherein said base member is formed of two skins of vacuum formed sheets of polyethylene fused together.

13. A container according to claim 12 wherein said sleeve is formed of corrugated material.

14. A container including:

a reusable pallet including raised indentations in the lower face of the pallet located inboard of corner portions of the pallet for defining relieved access areas in the sides thereof for receiving skids of a fork-lift truck or the like and receiving surfaces on at least the corner portions of the upper face of the pallet lying substantially in the same plane as said lower face of the pallet; and a sleeve comprising side walls having lower edges adapted to rest on the upper face of the pallet with the corners of the lower edges of the side walls seated on said receiving surfaces so as to lie in substantially the same plane as the lower face of the pallet below the raised indentations.

15. A container comprising:

a generally planar horizontally extending base member having downwardly opening tunnels extending across the lower face thereof for receipt of the forks of a fork-lift truck;

means defining upwardly facing surface portions around the periphery of said base member over said tunnels;

a sleeve member adapted to be positioned on said base member with circumferentially spaced portions of its lower peripheral edge respectively positioned over said tunnels in proximity to said surface portions;

a slot in at least certain of said lower peripheral edge portions of said sleeve member; and a plurality of latch members mounted on said base member at circumferentially spaced locations around said base member over said tunnels and adjacent said surface portions for reciprocal movement along a generally horizontal line of action between a latching position in which said latch members extend across a vertical projection of said surface portions and respectively pass through the slots in the lower peripheral edge portions of said sleeve for releasably securing said sleeve to said base member and a released position in which said latch members are slidably withdrawn from said vertical projection of said surface portions and disengaged from said slots in said lower peripheral edge portions of said sleeve to allow said sleeve to be removed from said base member.

16. A container according to claim 15 wherein:

the tips of said latch members are inboard of said surface portions in the released position of the latch members and said tips of said latch members are extended outwardly across said surface portions and pass through said slots in said lower edge portions of said sleeve in the latching position of said latch members.

17. A container comprising:

a generally planar horizontally extending base member having lower support surfaces;

means defining upwardly opening U-shaped groove means around the periphery of said base member and including a peripherally outer upwardly extending surface portion;

a sleeve member adapted to be positioned on said base member with its lower peripheral edge seated in said groove means;

a plurality of latch members mounted on said base member at circumferentially spaced locations around said base member adjacent said groove means for sliding movement along a generally horizontal line of action intersecting the peripherally outer upwardly extending surface portion of said groove means between a latching position in which said latch members extend across the vertical projection of said groove means and respectively engage the lower peripheral edge portion of said sleeve member at circumferentially spaced locations therearound for releasably securing said sleeve member to said base member and a released position in which said latch members are slidably withdrawn from said vertical groove means projection and disengaged from said peripheral edge portion of said sleeve member to allow said sleeve member to be removed from said base member;

a plurality of slots being provided in the lower peripheral edge portion of said sleeve member and said latch members being slidably mounted in said base member for reciprocal movement between said released position in which the tips of the latch members are inboard of said groove means, whereby to allow the lower edge of said sleeve member to be positioned in said groove means, and said latching position in which the tips of the latch members are extended outwardly across said groove means and pass through said slots in the lower edge portions of said sleeve member to releasably secure the sleeve member to said base member; and the undersurface of said base member being selectively raised in the vicinity of said latch members above the level of said lower support surface of said base to provide indentations for entry of the forks of a fork-life truck or the like and to allow operator access to said latch members.

18. A container comprising:

a generally planar rectangular base member having an undersurface defining downwardly facing support faces for the base member at the corners of the base member adapted to rest on an underlying supporting surface and selectively raised above the level of said support faces intermediate the corners of the base member to define tunnels for the entry of lift truck forks or the like, and an upper surface defining an upwardly facing rectangular seat extending continuously and completely around the periphery of said base member and lying, with the exception of the seat portions over said tunnels, generally in the plane of said support faces; and a sleeve having a selectively cut-away lower peripheral edge generally conforming, threedimensionally, to said seat so that the lower peripheral sleeve edge may be seated on said seat with the cutouts therein spanning said tunnels and the remainder of the peripheral edge lying generally in the plane of said support faces to transfer downward compressive loads applied to the container substantially directly to the supporting surface on which said support faces are positioned.

19. A generally rectangular pallet for use with an open ended sleeve member to form a container, said pallet comprising:
(A) a main body generally planar rectangular platform portion;
(B) a plurality of legs extending downwardly from said main body platform portion at circumferentially spaced locations around the periphery of said platform portion;
(C) means defining seat means on the peripheral of the upper face of said platform portion for receipt of the lower edge of the open ended sleeve to form the container;
(D) a plurality of latch members; and
(E) means mounting each of said latch members on said platform portion between a pair of circumferentially spaced legs for generally horizontal reciprocal movement between a released position clear of said seat means and a latching position extending across said seats means
whereby, with said latch members in their released positions, the lower edge of the sleeve may be positioned on said seat means whereafter said latch members may be moved to their latched positions to pass through slots in the lower edge of the sleeve to releasably secure the sleeve to said pallet.

20. A pallet according to claim 19 wherein:
(F) the tips of said latch members are inboard of said seat means in their released positions and said tips of said latch members are extended outwardly across said seat means in the latching position of said latch members.

21. A pallet according to claim 20 wherein:
(G) said pallet includes upwardly opening U-shaped peripheral groove means including inboard and outboard sidewall means and bottom wall means defining said seat means; and
(H) said latch members are mounted for reciprocal movement along a line of action that intersects said outboard wall means.

22. A pallet according to claim 20 wherein:
(G) an access opening is provided in the lower face of said platform portion beneath each latch member and between the respective pair of legs to provide access to the latch members.

23. A pallet according to claim 22 wherein:

(H) each latch member includes a handle portion extending downwardly through the respective access opening to facilitate movement of the latch member between its released and latched positions.

24. A pallet according to claim 19 wherein:
(F) said pallet comprises first and second plastic sheets which are joined together to form said platform portion and said latch members are slidably mounted between said first and second sheets.

25. A container comprising:
a base providing a bottom for the container;
a sleeve removably attached to the base for providing sides for the container, said base having a lower face adapted to rest on a supporting surface;
indentation means located inboard of corner portions of the base for defining areas in the sides of the base for receiving skids of a forklift truck or the like; and
receiving means on peripheral portions of the upper face of the base and adapted to receive lower edges of the sleeve at substantially the same level as said lower face whereby downward compressive loads applied to the container are transferred by the sleeve substantially directly to the supporting surface thereby minimizing deformation of peripheral portions of the base.

26. A generally rectangular molded plastic pallet for use with an open ended sleeve member to form a container, said pallet comprising:
a main body generally planar rectangular platform portion;
a plurality of legs extending downwardly from said main body platform portion at circumferentially spaced locations around the periphery of said platform portion;
means defining upwardly facing seat means on the periphery of the upper face of said platform portion for receipt of the lower edge of the open ended sleeve to form the container;
a plurality of latch members; and
means mounting each of said latch members on said platform portion at circumferentially spaced locations around the periphery of said platform portion for generally horizontal sliding movement between a release position clear of said seat means and a latching position extending above and across said seat means;
whereby with said latch members in their released positions the lower edge of the sleeve may be positioned on said seat means whereafter said latch members may be moved to their latched positions to pass through slots in the lower edge of the sleeve to releasably secure the sleeve to said pallet.

* * * * *